(No Model.)
A. P. DARONE.
TINNER'S SHEARS.
No. 522,108. Patented June 26, 1894.
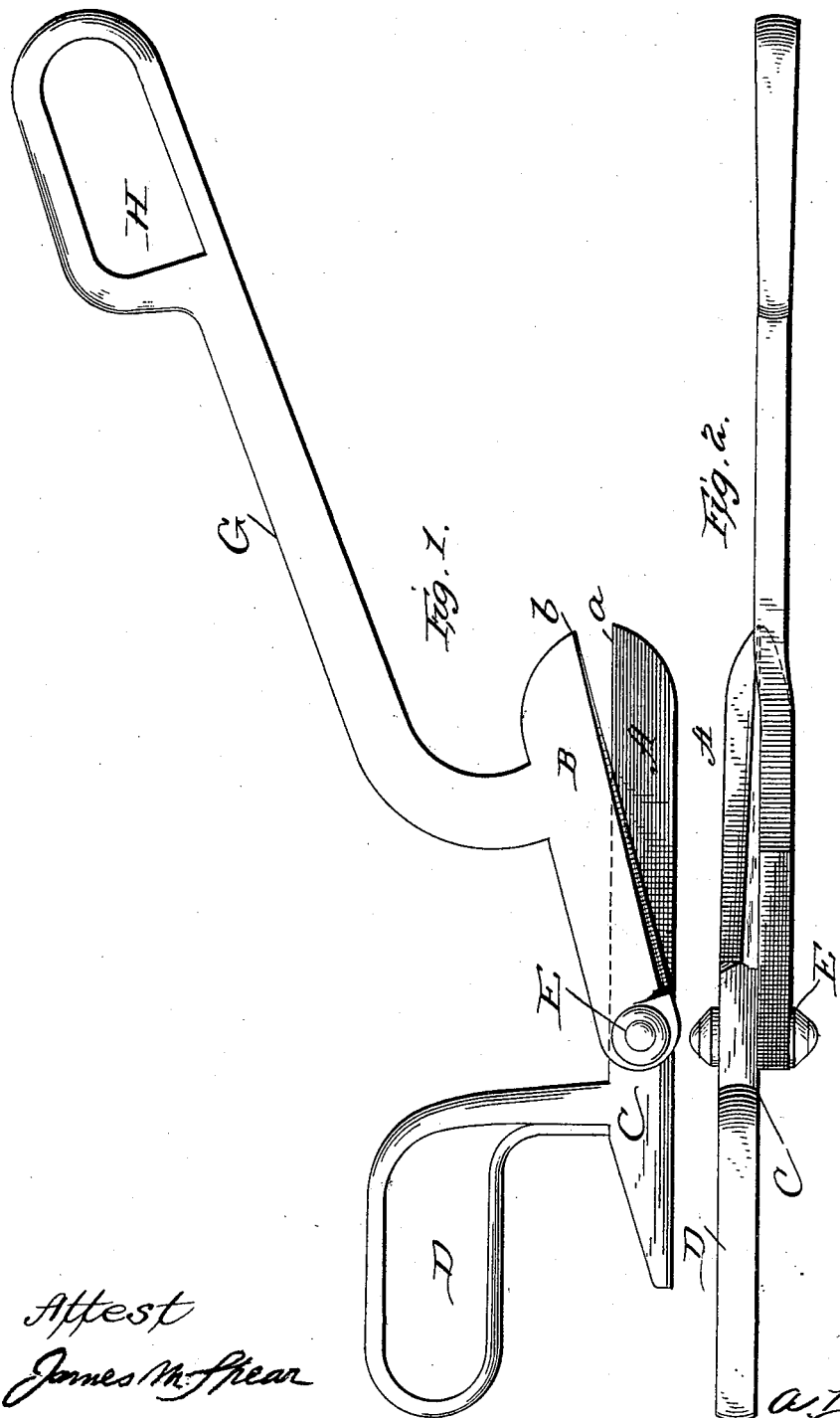

UNITED STATES PATENT OFFICE.

ALBERT P. DARONE, OF PHILADELPHIA, PENNSYLVANIA.

TINNER'S SHEARS.

SPECIFICATION forming part of Letters Patent No. 522,108, dated June 26, 1894.

Application filed February 17, 1894. Serial No. 500,454. (No model.)

*To all whom it may concern:*

Be it known that I, ALBERT P. DARONE, a citizen of the United States, residing at Philadelphia, in the State of Pennsylvania, have invented certain new and useful Improvements in Tinners' Shears, of which the following is a specification, reference being had therein to the accompanying drawings.

My invention relates to improvements in shears to be used in removing part of gutters or tin roofs and also for cutting the seams of the roof when it is to be removed entirely and for general use where shearing or cutting of metal is desired.

My invention is illustrated in the accompanying drawings, in which—

Figure 1, is a side elevation of my improved shears. Fig. 2, is a plan view.

The shears consist of the two blades A B, having the beveled sides and cutting edges $a$ $b$ as in the ordinary shears. Extending back of the cutting surface of the blade A is the projection C having the handle D formed thereon. The two blades A and B are pivoted together at E, the pivot piercing blade A just back of its cutting edge, and blade B near its rear end as shown.

Curved up from the blade B and extending forward, and running substantially parallel to the shears when closed is the arm G having a handle H formed on the end thereof. The blade A is made thin so as not to unduly raise the roof or gutter when inserted underneath it. A great leverage is given the upper blade by reason of the long arm G, thus the seam of a roof is easily severed. It will be noticed also in this connection that the lever G extends forward of the cutting blades, and this arrangement enables the operator to handle the tool with greater convenience and ease than with the usual arrangement of handles.

The shears are steadied and guided by the rear handle D.

I claim—

In a pair of shears, the bottom blade A arranged with its cutting edge uppermost and with its back to afford a bearing for the shears, the handle in rear of said lower blade and connected thereto, an upper blade B pivoted at the rear end of the cutting blade A and movable vertically toward and from the same and the handle extending upward and forwardly from the upper cutting blade whereby the shears may be opened and closed by raising and lowering the handle on the upper blade, substantially as described.

In testimony whereof I affix my signature in presence of two witnesses.

ALBERT P. DARONE.

Witnesses:
CLAS. F. HALL,
JOSEPH THOMASSON.